(12) United States Patent
Meirav

(10) Patent No.: US 10,086,324 B2
(45) Date of Patent: Oct. 2, 2018

(54) METHOD AND SYSTEM FOR IMPROVE-EFFICIENCY AIR-CONDITIONING

(71) Applicant: Enverid Systems, Inc., Newton, MA (US)

(72) Inventor: Udi Meirav, Newton, MA (US)

(73) Assignee: ENVERID SYSTEMS, INC., Needham, MA (US)

( * ) Notice: Subject to any disclaimer, the term of this patent is extended or adjusted under 35 U.S.C. 154(b) by 0 days.

(21) Appl. No.: 14/845,041

(22) Filed: Sep. 3, 2015

(65) Prior Publication Data
US 2015/0375157 A1 Dec. 31, 2015

Related U.S. Application Data

(63) Continuation of application No. 13/937,320, filed on Jul. 9, 2013, now abandoned, which is a continuation
(Continued)

(51) Int. Cl.
*B01D 53/02* (2006.01)
*F24F 3/044* (2006.01)
(Continued)

(52) U.S. Cl.
CPC ............ *B01D 53/02* (2013.01); *F24F 3/0442* (2013.01); *F24F 3/16* (2013.01); *B01D 53/047* (2013.01);
(Continued)

(58) Field of Classification Search
CPC ...... B01D 53/02; B01D 53/047; B01D 53/04; B01D 53/0446; B01D 53/0438; B01D 53/0462
(Continued)

(56) References Cited

U.S. PATENT DOCUMENTS

| 1,522,480 A | 1/1925 | Allen |
| 1,836,301 A | 12/1931 | Bechtold |

(Continued)

FOREIGN PATENT DOCUMENTS

| CA | 2640152 A1 | 4/2010 |
| CN | 2141873 Y | 9/1993 |

(Continued)

OTHER PUBLICATIONS

International Search Report and the Written Opinion of the International Searching Authority for International Application No. PCT/US2011/036801, dated Sep. 26, 2011.
(Continued)

*Primary Examiner* — Robert A Hopkins
(74) *Attorney, Agent, or Firm* — Cooley LLP

(57) ABSTRACT

Systems and methods for circulating air in an enclosed environment are disclosed. In some embodiments, the system includes an inlet to receive air from outside of the enclosed environment and an air handling unit coupled to the inlet and also configured to receive circulated air from the enclosed environment. The air handling unit can be configured to affect a temperature of at least one of the received outside air and the received circulated air. Based on the received outside air and the received circulated air, the air handling unit can be further configured to generate air for supplying to the enclosed environment.

16 Claims, 8 Drawing Sheets

Related U.S. Application Data of application No. 13/440,356, filed on Apr. 5, 2012, now Pat. No. 8,491,710, which is a continuation-in-part of application No. 13/109,833, filed on May 17, 2011, now Pat. No. 8,157,892, which is a continuation-in-part of application No. 12/848,788, filed on Aug. 2, 2010, now abandoned.

(60) Provisional application No. 61/345,194, filed on May 17, 2010, provisional application No. 61/351,968, filed on Jun. 7, 2010.

(51) Int. Cl.
| | |
|---|---|
| F24F 3/16 | (2006.01) |
| B01D 53/04 | (2006.01) |
| B01D 53/047 | (2006.01) |
| B01D 53/14 | (2006.01) |
| F24F 11/00 | (2018.01) |

(52) U.S. Cl.
CPC .......... B01D 53/0462 (2013.01); B01D 53/14 (2013.01); B01D 2257/504 (2013.01); B01D 2258/06 (2013.01); F24F 2011/0002 (2013.01); Y02C 20/10 (2013.01)

(58) Field of Classification Search
USPC .......................................... 96/108, 130, 148
See application file for complete search history.

(56) References Cited

U.S. PATENT DOCUMENTS

| | | |
|---|---|---|
| 3,107,641 A | 10/1963 | Haynes |
| 3,511,595 A | 5/1970 | Fuchs |
| 3,619,130 A | 11/1971 | Ventriglio et al. |
| 3,702,049 A | 11/1972 | Morris, Jr. |
| 3,751,878 A | 8/1973 | Collins |
| 3,808,773 A | 5/1974 | Reyhing et al. |
| 3,885,927 A | 5/1975 | Sherman et al. |
| 3,885,928 A | 5/1975 | Wu |
| 4,182,743 A | 1/1980 | Rainer et al. |
| 4,228,197 A | 10/1980 | Means |
| 4,249,915 A | 2/1981 | Sircar et al. |
| 4,292,059 A | 9/1981 | Kovach |
| 4,322,394 A | 3/1982 | Mezey et al. |
| 4,325,921 A | 4/1982 | Aiken et al. |
| 4,451,435 A | 5/1984 | Holter et al. |
| 4,472,178 A | 9/1984 | Kumar et al. |
| 4,530,817 A | 7/1985 | Hölter et al. |
| 4,551,304 A | 11/1985 | Holter et al. |
| 4,559,066 A | 12/1985 | Hunter et al. |
| 4,711,645 A | 12/1987 | Kumar |
| 4,810,266 A | 3/1989 | Zinnen et al. |
| 4,816,043 A | 3/1989 | Harrison |
| 4,892,719 A | 1/1990 | Gesser |
| 4,917,862 A | 4/1990 | Kraw et al. |
| 4,987,952 A | 1/1991 | Beal et al. |
| 5,046,319 A | 9/1991 | Jones |
| 5,087,597 A | 2/1992 | Leal et al. |
| 5,137,548 A | 8/1992 | Grenier et al. |
| 5,186,903 A | 2/1993 | Cornwell |
| 5,221,520 A | 6/1993 | Cornwell |
| 5,231,063 A | 7/1993 | Fukumoto et al. |
| 5,281,254 A | 1/1994 | Birbara et al. |
| 5,290,345 A | 3/1994 | Osendorf et al. |
| 5,292,280 A | 3/1994 | Janu et al. |
| 5,322,473 A | 6/1994 | Hofstra et al. |
| 5,352,274 A | 10/1994 | Blakley |
| 5,376,614 A | 12/1994 | Birbara et al. |
| 5,389,120 A | 2/1995 | Sewell et al. |
| 5,407,465 A | 4/1995 | Schaub et al. |
| 5,464,369 A | 11/1995 | Federspiel |
| 5,492,683 A | 2/1996 | Birbara et al. |
| 5,584,916 A | 12/1996 | Yamashita et al. |
| 5,646,304 A | 7/1997 | Acharya et al. |
| 5,672,196 A | 9/1997 | Acharya et al. |
| 5,675,979 A | 10/1997 | Shah |
| 5,702,505 A | 12/1997 | Izumi et al. |
| 5,707,005 A | 1/1998 | Kettler et al. |
| 5,827,355 A | 10/1998 | Wilson |
| 5,869,323 A | 2/1999 | Horn |
| 5,876,488 A | 3/1999 | Birbara et al. |
| 5,948,355 A | 9/1999 | Fujishima et al. |
| 5,964,927 A | 10/1999 | Graham et al. |
| 5,984,198 A | 11/1999 | Bennett et al. |
| 6,024,781 A | 2/2000 | Bulow et al. |
| 6,027,550 A | 2/2000 | Vickery |
| 6,102,793 A | 8/2000 | Hansen |
| 6,113,674 A | 9/2000 | Graham et al. |
| 6,123,617 A | 9/2000 | Johnson |
| 6,187,596 B1 | 2/2001 | Dallas et al. |
| 6,280,691 B1 | 8/2001 | Homeyer et al. |
| 6,364,938 B1 | 4/2002 | Birbara et al. |
| 6,375,722 B1 | 4/2002 | Henderson et al. |
| 6,402,809 B1 | 6/2002 | Monereau et al. |
| 6,432,367 B1 | 8/2002 | Munk |
| 6,432,376 B1 | 8/2002 | Choudhary et al. |
| 6,533,847 B2 | 3/2003 | Seguin et al. |
| 6,547,854 B1 | 4/2003 | Gray et al. |
| 6,605,132 B2 | 8/2003 | Fielding |
| 6,623,550 B2 | 9/2003 | Shah |
| 6,711,470 B1 | 3/2004 | Hartenstein et al. |
| 6,726,558 B1 | 4/2004 | Meirav |
| 6,773,477 B2 | 8/2004 | Lindsay |
| 6,796,896 B2 | 9/2004 | Laiti |
| 6,797,246 B2 | 9/2004 | Hopkins |
| 6,866,701 B2 | 3/2005 | Meirav |
| 6,908,497 B1 | 6/2005 | Sirwardane |
| 6,916,239 B2 | 7/2005 | Siddaramanna et al. |
| 6,916,360 B2 | 7/2005 | Seguin et al. |
| 6,930,193 B2 | 8/2005 | Yaghi et al. |
| 6,964,692 B2 | 11/2005 | Gittleman et al. |
| 6,974,496 B2 | 12/2005 | Wegeng et al. |
| 7,288,136 B1 | 10/2007 | Gray et al. |
| 7,407,533 B2 | 8/2008 | Steins |
| 7,407,633 B2 | 8/2008 | Potember et al. |
| 7,449,053 B2 | 11/2008 | Hallam |
| 7,472,554 B2 | 1/2009 | Vosburgh |
| 7,645,323 B2 | 1/2010 | Massenbauer-Strafe et al. |
| 7,662,746 B2 | 2/2010 | Yaghi et al. |
| 7,666,077 B1 | 2/2010 | Thelen |
| 7,802,443 B2 | 9/2010 | Wetzel |
| 7,846,237 B2 | 12/2010 | Wright et al. |
| 7,891,573 B2 | 2/2011 | Finkam et al. |
| 8,157,892 B2 | 4/2012 | Meirav |
| 8,317,890 B2 | 11/2012 | Raether et al. |
| 8,398,753 B2 | 3/2013 | Sergi et al. |
| 8,491,710 B2 | 7/2013 | Meirav |
| 8,734,571 B2 | 5/2014 | Golden et al. |
| 2001/0021363 A1 | 9/2001 | Poles et al. |
| 2001/0054415 A1 | 12/2001 | Hanai et al. |
| 2002/0056373 A1 | 5/2002 | Fielding |
| 2002/0078828 A1 | 6/2002 | Kishkovich et al. |
| 2002/0083833 A1 | 7/2002 | Nalette et al. |
| 2002/0147109 A1 | 10/2002 | Branover et al. |
| 2002/0183201 A1 | 12/2002 | Barnwell et al. |
| 2002/0193064 A1 | 12/2002 | Michalakos et al. |
| 2003/0037672 A1 | 2/2003 | Sircar |
| 2003/0097086 A1 | 5/2003 | Gura |
| 2003/0188745 A1 | 10/2003 | Deas et al. |
| 2004/0005252 A1 | 1/2004 | Siess |
| 2004/0069144 A1 | 4/2004 | Wegeng et al. |
| 2004/0118287 A1 | 6/2004 | Jaffe et al. |
| 2005/0133196 A1 | 6/2005 | Gagnon et al. |
| 2005/0191219 A1 | 9/2005 | Uslenghi et al. |
| 2005/0262869 A1 | 12/2005 | Tongu et al. |
| 2005/0284291 A1 | 12/2005 | Alizadeh-Khiavi et al. |
| 2006/0032241 A1 | 2/2006 | Gontcharov et al. |
| 2006/0054023 A1 | 3/2006 | Raetz et al. |
| 2006/0079172 A1 | 4/2006 | Fleming et al. |
| 2006/0148642 A1 | 7/2006 | Ryu et al. |
| 2006/0225569 A1 | 10/2006 | Schmidt et al. |
| 2006/0249019 A1 | 11/2006 | Roychoudhury et al. |

(56) References Cited

U.S. PATENT DOCUMENTS

| | | |
|---|---|---|
| 2008/0119356 A1 | 3/2008 | Ryu et al. |
| 2008/0078289 A1 | 4/2008 | Sergi et al. |
| 2008/0127821 A1 | 6/2008 | Noack et al. |
| 2008/0135060 A1 | 6/2008 | Kuo et al. |
| 2008/0182506 A1 | 7/2008 | Jackson et al. |
| 2008/0210768 A1 | 9/2008 | You |
| 2008/0293976 A1 | 11/2008 | Olah et al. |
| 2009/0000621 A1 | 1/2009 | Haggblom et al. |
| 2009/0120288 A1 | 5/2009 | Lackner et al. |
| 2009/0220388 A1 | 9/2009 | Monzyk et al. |
| 2009/0260372 A1 | 10/2009 | Skinner et al. |
| 2010/0076605 A1 | 3/2010 | Harrod et al. |
| 2010/0154636 A1 | 6/2010 | Liu et al. |
| 2010/0224565 A1 | 9/2010 | Dunne et al. |
| 2010/0254868 A1 | 10/2010 | Obee et al. |
| 2010/0262298 A1 | 10/2010 | Johnson et al. |
| 2010/0275775 A1 | 11/2010 | Griffiths et al. |
| 2010/0278711 A1 | 11/2010 | Find |
| 2011/0064607 A1 | 3/2011 | Hedman |
| 2011/0079143 A1 | 4/2011 | Marotta et al. |
| 2011/0085933 A1 | 4/2011 | Mazyek et al. |
| 2011/0146494 A1 | 6/2011 | Desai et al. |
| 2011/0179948 A1 | 7/2011 | Choi et al. |
| 2011/0189075 A1 | 8/2011 | Wright et al. |
| 2011/0192172 A1 | 8/2011 | Delacruz |
| 2011/0198055 A1 | 8/2011 | Meirav et al. |
| 2011/0206572 A1 | 8/2011 | McKenna et al. |
| 2011/0250121 A1 | 10/2011 | Schmidt |
| 2011/0262327 A1 | 10/2011 | Dillon et al. |
| 2011/0265648 A1 | 11/2011 | Meirav |
| 2011/0269919 A1 | 11/2011 | Min et al. |
| 2011/0277490 A1 | 11/2011 | Meirav |
| 2011/0296872 A1 | 12/2011 | Eisenberger |
| 2012/0004092 A1 | 1/2012 | Raatschen et al. |
| 2012/0012005 A1 | 1/2012 | Burke |
| 2012/0052786 A1 | 3/2012 | Clawsey |
| 2012/0076711 A1 | 3/2012 | Gebald et al. |
| 2012/0129267 A1 | 5/2012 | Daly |
| 2012/0137876 A1 | 6/2012 | Miller |
| 2012/0148858 A1 | 6/2012 | Wu |
| 2012/0152116 A1 | 6/2012 | Barclay et al. |
| 2012/0168113 A1 | 7/2012 | Karamanos |
| 2012/0216676 A1 | 8/2012 | Addiego et al. |
| 2012/0222500 A1 | 9/2012 | Riess et al. |
| 2012/0272966 A1 | 11/2012 | Makoto et al. |
| 2012/0311926 A1 | 12/2012 | Mittelmark |
| 2012/0321511 A1 | 12/2012 | Lorcheim |
| 2013/0052113 A1 | 2/2013 | Molins et al. |
| 2014/0326428 A1 | 11/2014 | Meirav et al. |
| 2015/0321135 A1 | 11/2015 | Meirav et al. |

FOREIGN PATENT DOCUMENTS

| | | |
|---|---|---|
| CN | 2729562 Y | 9/2005 |
| CN | 1872388 A | 12/2006 |
| CN | 101072620 A | 11/2007 |
| CN | 101199913 A | 6/2008 |
| CN | 101444693 A | 6/2009 |
| CN | 101500704 A | 8/2009 |
| CN | 101564634 A | 10/2009 |
| CN | 201363833 Y | 12/2009 |
| CN | 202032686 U | 11/2011 |
| CN | 103119376 A | 5/2013 |
| EP | 0 475 493 A2 | 3/1992 |
| ES | 2387791 A1 | 4/1983 |
| JP | 56-158126 A | 12/1981 |
| JP | 59-225232 A | 12/1984 |
| JP | 60194243 | 10/1985 |
| JP | 02-092373 A | 3/1990 |
| JP | 5-161843 A | 6/1993 |
| JP | 06-031132 A | 2/1994 |
| JP | 09085043 A | 3/1997 |
| JP | 200291978 A | 10/2000 |
| JP | 2001-170435 A | 6/2001 |
| JP | 2001232127 A | 8/2001 |
| JP | 3207936 B2 | 9/2001 |
| JP | 2005-090941 A | 4/2005 |
| JP | 2006275487 A | 10/2006 |
| JP | 2009-202137 A | 9/2009 |
| JP | 2010-149086 A | 7/2010 |
| WO | WO 88805693 | 8/1988 |
| WO | WO 2002008160 A1 | 1/2002 |
| WO | WO 200212796 A2 | 2/2002 |
| WO | WO 2007/128584 A1 | 11/2007 |
| WO | WO 2007128584 A1 | 11/2007 |
| WO | WO 2008155543 A2 | 12/2008 |
| WO | WO 2009126607 A2 | 10/2009 |
| WO | WO 2010091831 A1 | 8/2010 |
| WO | WO 2010124388 A1 | 11/2010 |
| WO | WO 2011114168 A1 | 9/2011 |
| WO | WO 2011146478 A1 | 11/2011 |
| WO | WO 2012134415 A1 | 10/2012 |
| WO | WO 2012158911 A2 | 11/2012 |
| WO | WO 2013074973 A1 | 5/2013 |
| WO | WO 2013106573 A1 | 7/2013 |
| WO | WO 2014015138 | 1/2014 |
| WO | WO 2014047632 | 3/2014 |
| WO | WO 2014078708 | 5/2014 |
| WO | WO 2014153333 | 9/2014 |
| WO | WO 2014176319 | 10/2014 |
| WO | WO 2015042150 | 3/2015 |
| WO | WO 2015123454 | 8/2015 |

OTHER PUBLICATIONS

"EPA Ventilation and Air Quality in Offices, Fact Sheet" United States Environmental Protection Agency, Air and Radiation (6609J0, Revised Jul. 1990).

Gesser, H.D., "The Reduction of Indoor Formaldehyde Gas and that Emanating from Urea Formaldehyde Foam Insulation (UFFI)", Environmental International, vol. 10, pp. 305-308, 1984.

Jones, Christopher W., "CO2 Capture from Dilute Gases as a Component of Modern Global Carbon Management", Annual Review of Chemical and Biomolecular Engineering, vol. 2, pp. 31-52, 2011.

Ma, Chanjuan et al., "Removal of low-concentration formaldehyde in air by adsorption on activated carbon modified by hexamethylene diamine", Carbon, vol. 49, pp. 2869-2877, 2011.

Nuckols, M. L. et al., "Technical Manual: Design Guidelines for Carbon Dioxide Scrubbers", Naval Coastal Systems Center, vol. 4110, pp. 1-83, Revision A, Jul. 1985.

United States Environmental Protection Agency, "Carbon Adsorption for Control of VOC Emissions: Theory and Full Scale System Performance", vol. 450, pp. 88-012, Jun. 1988.

Serna-Guerrero, Rodrigo et al., "Triamine-grafted pore-expanded mesoporous silica for CO2 capture: Effect of moisture and adsorbent regeneration strategies", Adsorption, vol. 16, pp. 567-575, 2010.

Sidheswaran, Meera A. et al., "Energy efficient indoor VOC air cleaning with activated carbon filter (ACF) filters", Building and Environment, vol. 47, Apr. 2011, pp. 357-367.

Zorflex® ACC, 100% Activated Woven Carbon Cloth, Calgon Carbon Corporation, 2008, www.calgoncarbon.com, 2 pages.

Zorflex® ACC, 100% Activated Woven Carbon Cloth, Calgon Carbon Corporation, 2011, www.calgoncarbon.com, 2 pages.

Gray, M. L. et al., "Performance of immobilized tertiary amine solid sorbents for the capture of carbon dioxide", International Journal of Greenhouse Gas Control, vol. 2, Issue 1, Jan. 2008, pp. 3-8.

Goeppert et al., "Carbon Dioxide Capture from the Air Using a Polyamine Based Regenerable Solid Adsorbent," J. Am. Chem. Soc., vol. 133, No. 50, Nov. 21, 2011 (Nov. 21, 2011) pp. 20164-20167 entire document.

US 10,086,324 B2

METHOD AND SYSTEM FOR IMPROVE-EFFICIENCY AIR-CONDITIONING

CROSS REFERENCE TO RELATED APPLICATIONS

This application is a continuation of U.S. patent application Ser. No. 13/937,320, filed on Jul. 9, 2013, which is a continuation of U.S. patent application Ser. No. 13/440,356, filed on Apr. 5, 2012, (now U.S. Pat. No. 8,491,710), which is a continuation of U.S. patent application Ser. No. 13/109,833, filed on May 17, 2011, (now U.S. Pat. No. 8,157,892), which claims priority to and is a continuation-in-part of U.S. patent application Ser. No. 12/848,788 to Meirav, filed Aug. 2, 2010, and entitled "Method and System for Improved-Efficiency Air-Conditioning," which claims priority to U.S. Provisional Patent Application No. 61/345,194, filed May 17, 2010, and U.S. Provisional Patent Application No. 61/351,968, filed Jun. 7, 2010. The disclosures of the above applications are incorporated herein by reference in their entireties.

TECHNICAL FIELD

The present application generally relates to air circulation systems and in particular to removal of various substances from and/or cleaning of air circulation systems.

BACKGROUND

Heating, Ventilation and Air-Conditioning ("HVAC") are standard in virtually every modern building. Indeed, HVAC is often one of the largest parts of the entire energy budget of most buildings. This is particularly the case in extreme climates, both hot and cold. One of the goals of HVAC systems is to provide comfortable and healthy environment for building occupants, in terms of temperature, humidity, composition and cleanliness of air.

Central HVAC systems in buildings typically include one or more central air handling unit(s) and an air distribution system, where supply air is directed to various parts of a building through a network of ducts, and return air flows from these spaces, through other ducts or a plenum, back to the air handling unit(s). In the air handling unit, the air is cooled and/or heated, as well as filtered and often dehumidified and/or humidified, as needed. Thus, HVAC systems constantly circulate air through the building while continually adjusting its temperature and humidity to maintain comfortable environment.

However, in order to maintain good air quality, not all the air is recirculated. Some of the air leaks out through doors, windows, etc. and some fraction of the circulating air is intentionally exhausted outside the building. This is referred to as exhaust air. The exhaust air is replaced by an intake of outside air, also known as makeup air, to make up for the exhaust air being taken out. This is also referred to as "fresh air" or ventilation. This replacement of air is done because occupants of the building and the equipment consume oxygen and emit carbon dioxide ($CO_2$) as well as a variety of other contaminants that gradually compromise quality and safety of the air. Such replacement of the air maintains fresh air quality.

Oxygen represents approximately 21% of atmospheric air and that is normally the desired level of indoor air as well. On the other hand $CO_2$ is present only in very low levels in the outside air, typically at a level of approximately 400 parts per million ("ppm"). Once elevated levels of $CO_2$ or reduced levels of oxygen are created, a fairly significant amount of outside air is needed to bring their respective concentrations close to the desired level. Indeed, to fully restore oxygen and $CO_2$ concentration virtually all the air may need to be replaced.

The outside air represents an additional, and depending on the outside climate conditions often a significant, thermal load on the air handling unit. In the case of a hot and humid climate, for example, the outside air injected into the HVAC system can require additional energy for cooling and dehumidifying the outside air and can represent a significant fraction of the entire thermal load and energy usage of the HVAC system.

The amount of exhaust air and outside air can be adjusted to meet the air quality standards. Certain minimum amounts of levels of oxygen, $CO_2$ and other contaminants, a variety of organic gases collectively referred to as volatile organic compounds or VOCs, are often set to maintain air quality. In the USA, the American Society of Heating, Refrigeration and Air-conditioning Engineers ("ASHRAE") issues guidelines, including the ASHRAE Standard 62, for the amount of outside air ventilation recommended for a given space and number of occupants. However, the greater the rate of air replacement, the more energy is consumed by the HVAC system.

SUMMARY

In some embodiments, the amount of supply air used by an HVAC system, and hence the amount of energy used for heating and cooling, while maintaining desirable air quality and composition, can be reduced by removing unwanted substances such as gases, including carbon dioxide ($CO_2$), contaminants, particles, etc. using scrubbers or other devices that can separate these gases from the circulating air. Optionally, the quality of air can be further improved with injection of concentrated oxygen. In some embodiments, a fraction of the circulating air can be diverted though the scrubbers to achieve the desired result. While in a normal HVAC system frequent extensive replacement of the building air is performed, scrubbing of $CO_2$ and other unwanted gases and vapors, can achieve the same goal, but with much lower thermal load on the HVAC system, thereby providing significant energy saving for the building and reducing demands on the entire electrical grid.

In some embodiments, the HVAC system can include an oxygen injection system that can inject oxygen-enriched air into the circulated air.

In some embodiments, a control system for use with an HVAC system can include a gas scrubbing system for removal of an unwanted substance gas from circulated air. The control system can include a sensor for determining an amount of the unwanted substance(s), particle(s), gas(es), etc. in the circulated air. A minimum level of outside air replacement can be maintained, and a controller can modify a rate of exhaust of circulating air and intake of outside air so as to adjust overall air replacement according to the measured amount of unwanted substance(s), particle(s), gas(es), etc. in the circulated air. The control system also can include an oxygen sensor for determining an amount of oxygen in circulated air. The controller can further modify the rate of oxygen injection.

In some embodiments, the system can be a modular system that can be connected to an HVAC system that can circulate air in an enclosed environment. The modular system can include a module for scrubbing configured to reduce a level of an unwanted substance in the circulating air.

In some embodiments, the current subject matter relates to a system for circulating air in an enclosed environment. The system can include an inlet configured to receive an outside air from outside of the enclosed environment and an air handling unit coupled to the inlet to receive the outside air through the inlet and configured to receive a circulated air from the enclosed environment. The air handling unit can be configured to affect a temperature of at least one of the received outside air and the received circulated air. Based on the received outside air and the received circulated air, the air handling unit can be further configured to generate air for supplying to the enclosed environment. The current subject matter system can also include an air circulation system configured to circulate the generated air from the air handling unit to the enclosed environment and back to the air handling unit and a scrubbing system coupled to at least one of the air handling unit and the air circulation system and configured to reduce presence of at least one substance in the air supplied to the enclosed environment.

In some embodiments, the current subject matter relates to a process for circulating air in an enclosed environment. An outside air from outside of the enclosed environment and a circulated air from the enclosed environment are received. At least one of the received outside air and the received circulated air are conditioned so as to supply at least one of the received outside air and the received circulated air at a desired temperature to the enclosed environment. The conditioned air is circulated into and from the enclosed environment. At least some of the received circulated air from the enclosed environment is scrubbed to reduce presence of at least one substance in the circulated air. The scrubbed air is recirculated. At least a portion of the circulated air is exhausted from the enclosed environment.

In some embodiments, the current subject matter relates to a control system for use with an HVAC system having a gas scrubbing system for removal of an unwanted gas from circulated air. The control system can include a sensor for determining an amount of the unwanted gas in the circulated air and a controller configured to modify a rate of exhaust of circulated air or intake of outside air so as to adjust an overall air replacement according to the measured amount of unwanted gas in the circulated air.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The current subject matter is described with reference to the accompanying drawings. In the drawings, like reference numbers indicate identical or functionally similar elements. Additionally, where applicable, the left-most digit(s) of a reference number identifies the drawing in which the reference number first appears. In the figures.

DETAILED DESCRIPTION

Figure 1:
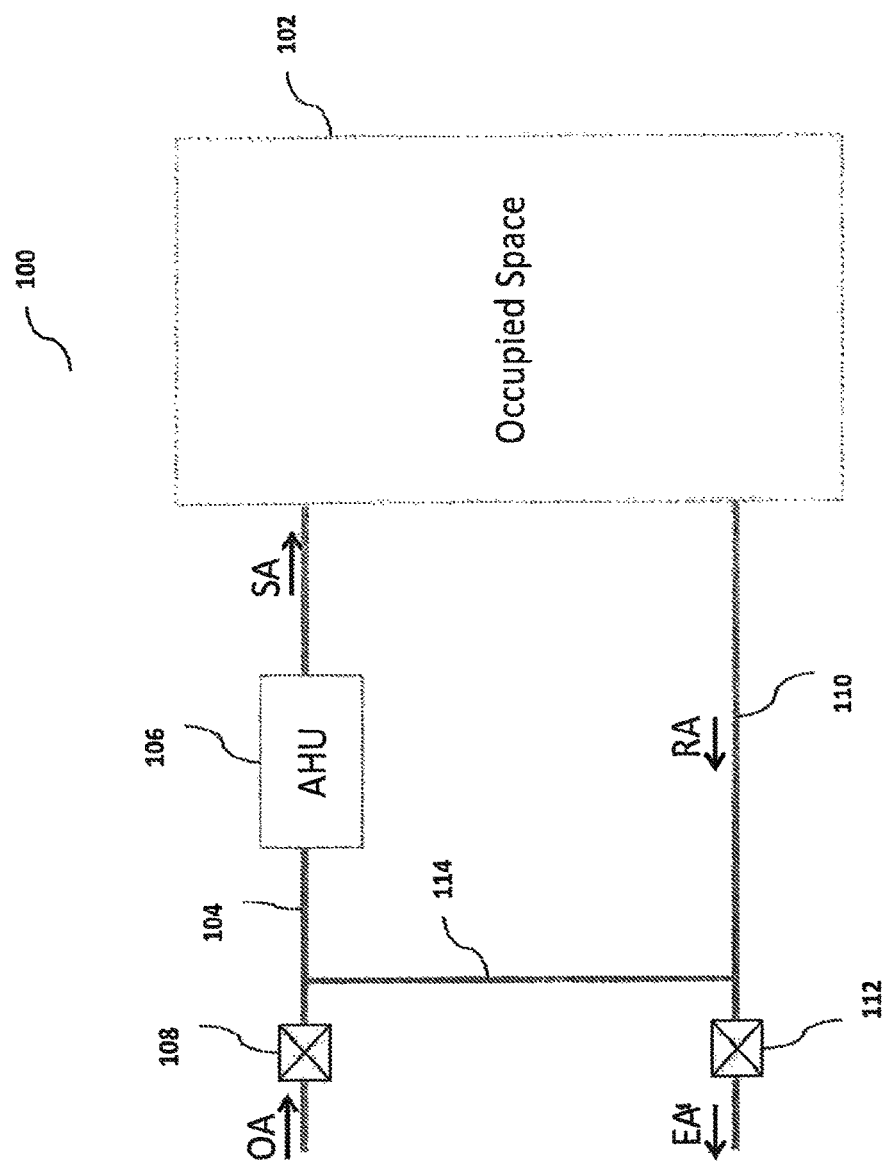
FIG. 1 is a block diagram illustrating an HVAC system.

FIG. 1 is a block diagram illustrating a circulating central HVAC system 100. The system 100 can be configured to provide air circulation to an occupied space 102 to which it is connected. The system 100 further includes an air handling unit ("AHU") 106, which has both heating and cooling elements that modify temperature of the circulating air as it flows and comes in contact with these elements. The system 100 can further include air intake duct(s) 108 connected to the AHU 106 via circulation lines 104 that allow intake of outside air ("OA") into the system 100 and specifically AHU 106. The system 100 can also include exhaust duct(s) 112 that receive return air ("RA") via lines 110 and expunge it as an exhaust air ("EA") into the outside atmosphere (or any other environment).

In operation, the fans or blowers that can be disposed in the AHU 106 force the flow of the conditioned supply air ("SA") through ducts that distribute the conditioned air throughout the various parts of the occupied space 102 (which can be an enclosed environment). For ease of illustration, the following description refers to a building as an example of an enclosed environment 102. The building 102 can have different zones for which rates of air flow can be different. Return air can flow back to the air handling unit 106 via lines 114 and can be filtered to remove particles, bacteria, substances, various fumes, and/or a combination thereof. Some of the return air can be exhausted outside the building 102 as exhaust air. The air can be exhausted through valves that control the amount of exhaust air being released. At the same time, fresh outside air can be pulled in to replace the exhaust air and maintain a correct overall volume and pressure of air in the building 102. Typically 10-15% of airflow can be released as exhaust and replaced, but this number can vary widely. In some environments, such as bathrooms and kitchens, the HVAC system can be configured to exhaust and replace 100% of the air flow. The constant replacement of exhaust air with outside air can be intended to maintain good air quality, and in particular, replenish oxygen consumed by the building occupants and remove substances, particles, gases (e.g., carbon dioxide), fumes other compounds, and/or a combination thereof generated by occupants, equipment and/or materials located inside the enclosed environment 102.

In some embodiments, the enclosed environment 102 can be an office building, a commercial building, a bank, a residential building, a house, a school, a factory, a hospital, a store, a mall, an indoor entertainment venue, a storage facility, a laboratory, a vehicle, an aircraft, a ship, a bus, a theatre, a partially and/or fully enclosed arena, an education facility, a library and/or other partially and/or fully enclosed structure and/or facility which can be at times occupied by equipment, materials, live occupants (e.g., humans, animals, synthetic organisms, etc.), etc., and/or any combination thereof.

Figure 2A:
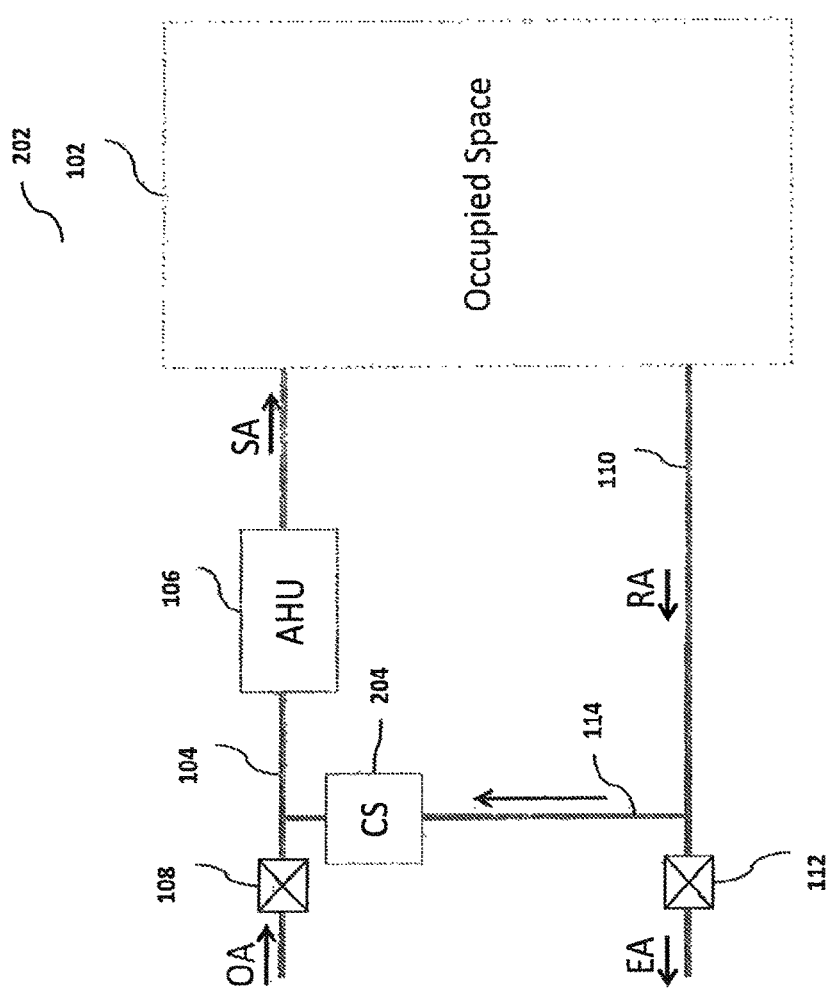
FIG. 2A is a block diagram illustrating an exemplary HVAC system incorporating substance scrubbing and oxygen injection components, according to some embodiments of the current subject matter.
Figure 2B:
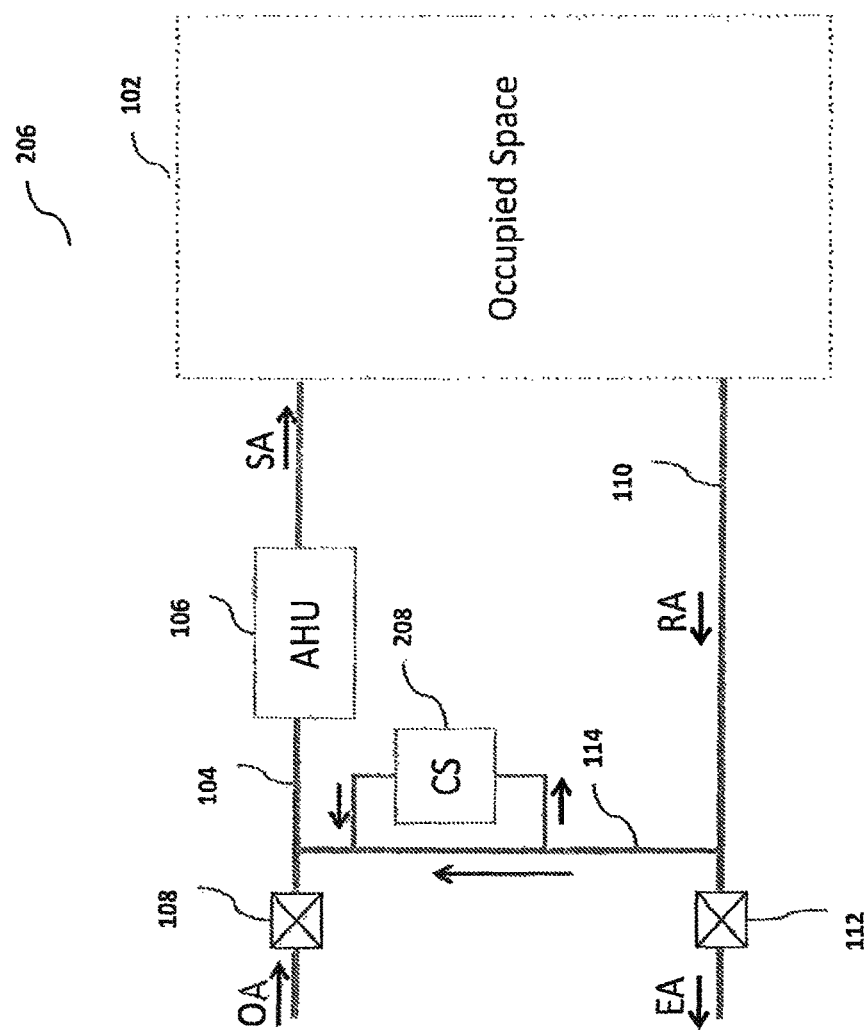
FIG. 2B is a block diagram illustrating another exemplary HVAC system, according to some embodiments of the current subject matter.
Figure 2C:
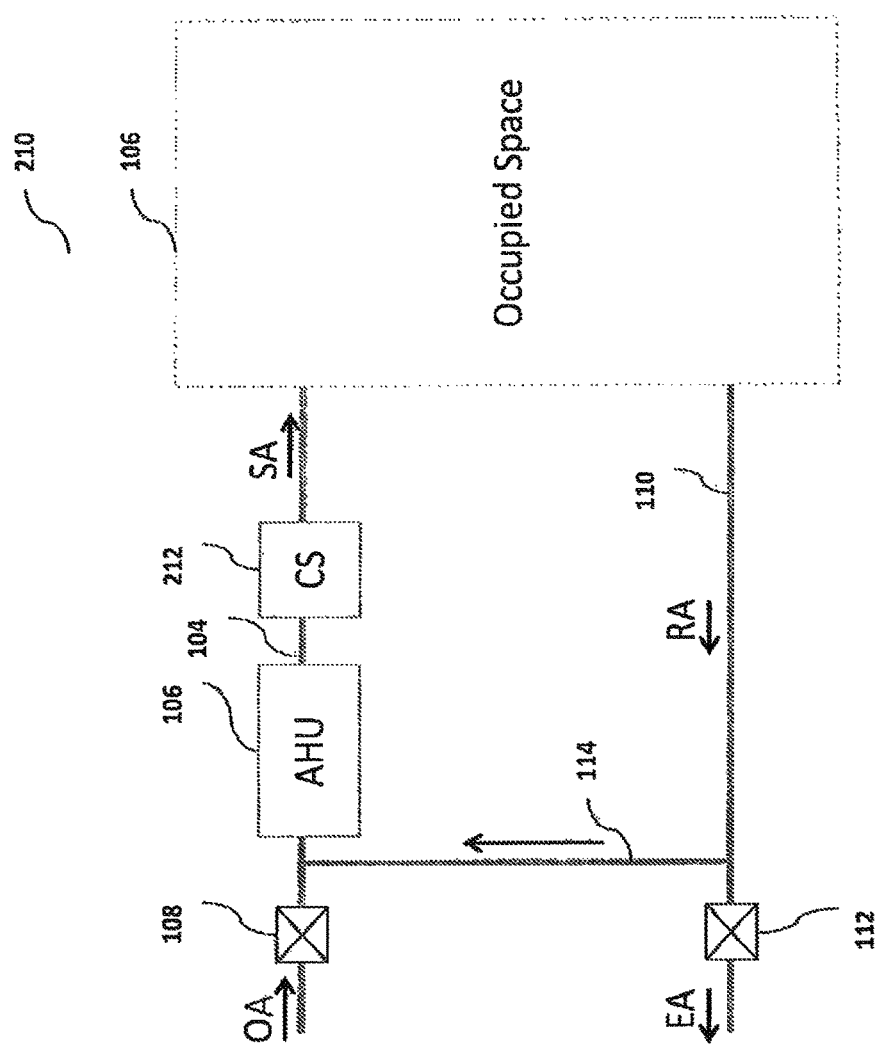
FIG. 2C is a block diagram illustrating yet another exemplary HVAC system, according to some embodiments of the current subject matter.

FIGS. 2A, 2B and 2C are block diagrams schematically illustrating various ways to incorporate air scrubbers in the HVAC system 100 shown in FIG. 1 to allow reduction of exhaust air and outside air. FIG. 2A illustrates an HVAC system 202 that can be configured to incorporate a scrubber ("CS") 204 in line 114 that connects the intake line 104 and thereby the AHU 106 and the return air line 110. The return air travelling along the line 110 can be split into a fraction that is diverted to the CS 204 and another fraction diverted to the exhaust duct 112 for expunging into the atmosphere.

FIG. 2B illustrates another exemplary way of incorporating a scrubber into an HVAC system. As shown in FIG. 2B, an HVAC system 206 can include a scrubber 208 that is connected to the line 114 (as opposed to being placed in the line 114, as shown in FIG. 2A). The return air travelling along the line 110 can be split into two fractions: one going to the exhaust duct 112 and the other going to the line 114. The fraction of the return air that travels along the line 114 can be further split into a fraction that bypasses the CS 208 and the one that travels into the CS 208 for scrubbing. Once the CS 208 scrubs or "cleans" that fraction, it is re-entered into the line 114 for supplying to the AHU 106, as shown by the arrows in FIG. 2B.

FIG. 2C illustrates yet another exemplary way of incorporating a scrubber into an HVAC system. In this case, system 210 can include a scrubber 212 in the line 104 placed between the AHU 106 and the occupied space 106. Hence, any air that is travelling through the AHU 106 can be scrubbed or "cleaned" by CS 212 immediately before it enters the occupied space 102. Other ways of incorporating a scrubber into an HVAC system are possible.

In some embodiments, only a fraction of the circulating air stream can be diverted to the scrubber, which can intercept the flow of the diverted air. The scrubber can subsequently allow scrubbed air to continue to flow back into the general circulation with substances, compounds, particles, fumes, gases (e.g., $CO_2$), etc. partially and/or fully captured, filtered, and/or removed from the scrubbed air. As shown in FIGS. 2A-C, the scrubber can be implemented in many different ways.

In some embodiments, to absorb substances, compounds, particles, fumes, gases, etc. the scrubber 204, 208, 212 can use adsorbent materials, molecular sieves, porous materials, sponge-like materials, electrically and/or electro-magnetically charged liners or objects, any other chemical, biological attractants, and/or any combination thereof. Such materials can be placed in a container, stacked in columns, disposed as a sheet or a lining the inside of one or more lines of the system shown in the FIGS. 1-5. For example, several porous materials have been shown to be effective adsorbents of $CO_2$, notably a number of synthetic zeolites, but also porous alumina, and metal organic frameworks. These are readily available from a variety of commercial sources, such as W.R. Grace SYLOBEAD® C-Grade 13X, Intera Global Corporation's mSorb®, and generic producers such as Pingxiang XINTAO Chemical Packing Co., Ltd. In China, GHCL Ltd., in India, and many others. Zeolite beds have been developed to extract $CO_2$ from a gas stream for various industrial applications (e.g., U.S. Pat. No. 3,619,130 to Ventriglio et al.; U.S. Pat. No. 3,808,773 to Reyhing et al.; U.S. Pat. No. 3,751,848 to Collins; U.S. Pat. No. 3,885,928 to Shermen et al.; U.S. Pat. No. 4,249,915 to Sirkar et al.; U.S. Pat. No. 5,137,548 to Grenier et al.). For the purposes of adsorption of $CO_2$ such technologies can be adopted for use by the current subject matter HVAC systems and can be more forgiving in terms of the allowed residual $CO_2$ in the outflow. In some embodiments, addition of other adsorbents, including multiple zeolites, porous alumina (e.g., U.S. Pat. No. 4,433,981 to Slaugh et al.; U.S. Pat. No. 4,711,645 to Kumar et al.) or activated charcoal (e.g., U.S. Pat. No. 1,522,480 to Allen; U.S. Pat. No. 1,836,301 to Bechthold) can improve air quality or energy efficiency by removing other gases, volatile organic compounds and humidity or by allowing lower-temperature release of adsorbents.

More recent developments in the field of solid adsorption or $CO_2$ include metal organic frameworks (U.S. Pat. No. 6,930,193 to Yaghi et al.; U.S. Pat. No. 7,662,746 to Yaghi et al.) and amine-impregnated clays (U.S. Pat. No. 6,908,497 to Siriwardane). These adsorbents can be suitable for use in the current subject matter systems described herein. The current subject matter system can be implemented with any past, currently-available, and future adsorbents designed to scrub or "clean" air. In some embodiments, the combination of several different adsorbents in the same unit or as separate units may offer the better performance.

Figure 3:
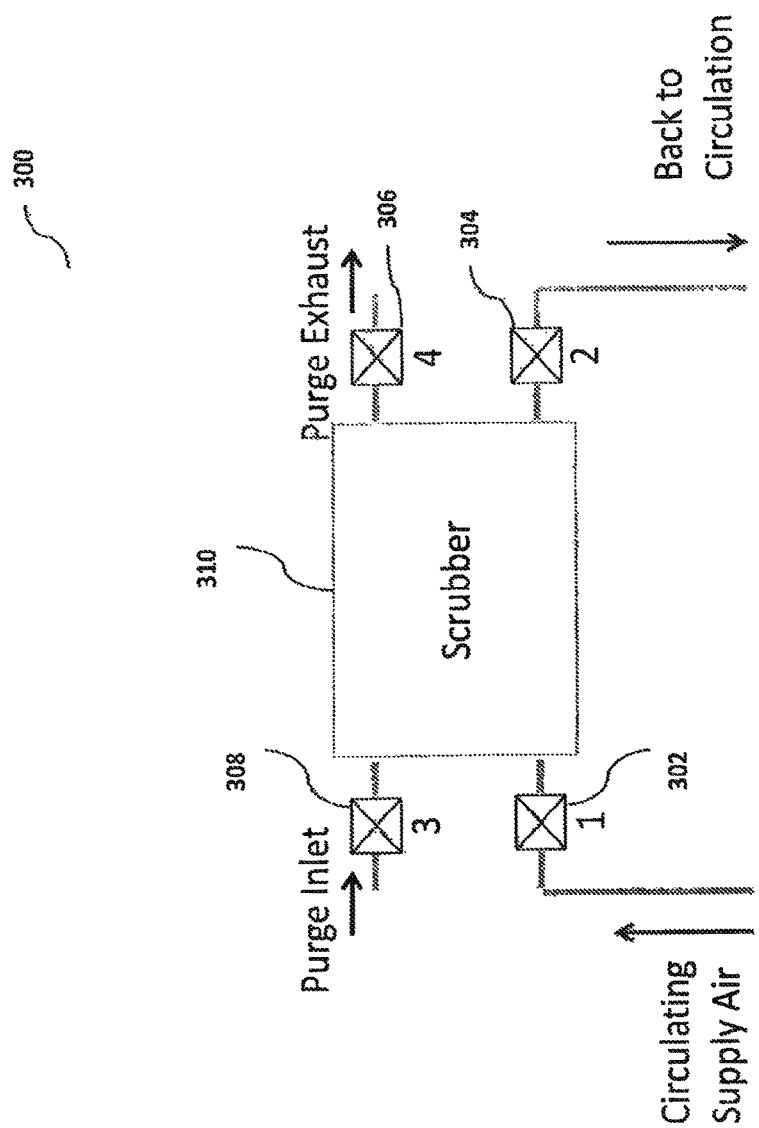
FIG. 3 is a block diagram illustrating an exemplary HVAC system that can include a configuration of valves and lines allowing the scrubber to switch from an adsorption mode to a purge mode, according to some embodiments of the current subject matter.

FIG. 3 illustrates an exemplary scrubber system 300 that can be incorporated into systems shown in FIGS. 1 and 2A-C, according to some embodiments of the current subject matter. The system 300 includes a scrubber 310, a circulating supply air valve 302 ("Valve 1"), a back-to-circulation valve 304 ("Valve 2"), a purge inlet valve 308 ("Valve 3"), and a purge exhaust valve 306 ("Valve 4"). The scrubber 310 can be configured to operate in two cycles: an adsorption cycle and a regeneration cycle, as discussed below. During the adsorption cycle, Valves 1 and 2 are open and can allow entry of, adsorption of substances, particles, fumes, gases, etc. from, and subsequent exit of the circulating air. During this cycle, Valves 3 and 4 are closed. Whereas, during the regeneration cycle, Valves 1 and 2 are closed, while Valves 3 and 4 are open. Valves 1 and 2 can couple the scrubber 310 to the circulating lines, whereas Valves 3 and 4 can couple the scrubber 310 to the purging lines, as shown in FIG. 3.

As such substances, particles, fumes, gases, hazardous vapors (e.g., radioactive vapors) etc. (hereinafter, "substances") captured from the circulating air accumulate in the scrubber 310, the substances can be removed from the scrubber 310 at a predetermined rate. Removal of substances can be referred to as a "regeneration" or a "regeneration cycle". Such substances can be released into the atmosphere or otherwise collected, disposed of, sequestered, and/or any combination thereof. Regeneration can be achieved by a combination of heating, purging, pressure change, electrical energy, and/or any combination thereof. In some embodiments, the release of substances can be achieved by a combination of heating and purging with air or other purge gas. Thus, an adsorption-desorption cycle can sometimes be referred to as a temperature-swing adsorption.

As stated above, during the regeneration cycle, the scrubber 310 can be isolated from the HVAC system circulation by Valves 1 and 2, shown in FIG. 3, and instead, can be connected to the incoming and outgoing purging lines using Valves 3 and 4. While Valves 1 and 2 are closed and Valves 3 and 4 are open during the regeneration cycle, purge gas, air, and/or any other purge substance can be configured to flow through the scrubber 310 while it is isolated from the air circulation system. The scrubber 310 can run the adsorption and regeneration cycles at periodically, at predetermined times, and/or as necessary (for example, upon detection of adsorption of a particular substance or a specific amount of a substance). The scrubber 310 can be also configured to run each cycle for a predetermined period of time. Alternatively, the length of time that each cycle can be performed depends on the substance adsorbed/purged, time that it takes to adsorb/purge a substance or a particular amount of the substance, interior conditions, exterior conditions, type of the occupied space 102, energy usage, environmental regulations, commercial factors, and/or any other factors, and/or a combination of factors. If the scrubber regeneration interrupts the continual scrubbing process for an unacceptably long period of time, multiple scrubbers (not shown in FIG. 3) can be used to avoid such interruption, so that when one scrubber is undergoing regeneration, another scrubber can be engaged in one of the cycles. Short interruptions in operation of the scrubber will likely not pose a problem with air circulation, as long as the aggregate amount of substances, $CO_2$, VOCs, etc. removed over extended periods of several hours is sufficient. Similar multiple-system back up can be implemented for other components of the system, such as an oxygen concentrator(s).

In some embodiments, the scrubber adsorbent bed design can include an appropriate choice of adsorbent material, its amount, its spatial distribution, an air flow pattern and its overall capacity can be compatible with various airflow design requirements. In designing the scrubber, system size and cost versus throughput, frequency of regeneration and energy requirements for regeneration can be also considered. The amount of substances, $CO_2$, VOCs, etc. that can be collected and released in each temperature swing adsorption cycle can depend on the amount of active and accessible adsorbent material, and for certain adsorbents can depend on the temperature gap between the adsorption and purge cycle. Thus, to achieve a certain rate of gas capture one can use less material and operate with more frequent purge cycles. The cycles as well as their frequency can also depend on natural kinetic rates of adsorption and desorption for a particular material, flow rate and temperature that constrain the cycle time for a given amount of material. To minimize energy required, i.e., the energy that can be required to heat the purge gas, a lower purge gas temperature can be used, which can reduce the amount of material desorbed per cycle. In an application that is primarily driven by energy savings, one can start with the temperature and volume of purge gas that can be generated using an excess heat of the HVAC system and use that available purge temperature to design the thermal range of the temperature swing cycle, which in turn will determine the kinetics of the adsorbent design the dimensions of the bed.

In some embodiments, an HVAC system having temperature swing adsorption with solid adsorbents can provide simplicity, durability, scalability to different sizes, and a relatively low operating cost. There are many other ways to remove substances, $CO_2$, VOCs, as well as other unwanted gases, fumes, and/or vapors. In some embodiments, substance, $CO_2$, VOC, etc. scrubbing can be achieved by reactions with alkaline hydroxide bases. In some embodiments, substance, $CO_2$, VOC, tec. scrubbing can be achieved using aqueous amine gas solutions, such as monoethanolamine or other amines that are well known. In some embodiments, scrubbing can be achieved by a chemical cycle in which sodium carbonate combines with carbon dioxide and water to form sodium bicarbonate (e.g., U.S. Pat. No. 3,511,595 to Fuchs). Other techniques for removal of substances, $CO_2$, VOCs, etc. can include selective membranes, for example, PRISM membranes from Air Products, Inc, or CYNARA membranes from Cameron International Corp. Since the scrubber can be a separate module in this systems, other scrubbing technologies (past, currently available, or future) can be used in such system without having to change its other components.

In some embodiments, to regenerate the scrubber, at least some of the above techniques can use heat for regeneration. Some of that heat can be obtained by harvesting waste heat produced by other systems nearby, including the compressor and the air handling unit of the HVAC system, as well as solar energy. This can further improve the overall economics of the system. In some embodiments, the purging of the adsorbent bed utilizes warm air from the cooling unit to purge the bed during regeneration. In some embodiments, solar energy can be collected on a rooftop unit and/or a separately located unit and used to heat the purge gas. Solar heating and harvesting compressor heat and other wasted heat can be used in combination with one another to minimize the energy usage of the system as a whole. Independent or additional heating can be performed to achieve a particular purge gas temperature in which case a heating coil, a furnace or a gas burner can be incorporated to the system before the entry point of the purge gas.

Referring back to FIG. 2A, the scrubber (CS) 204 can be configured to intercept all of the return air flow, which might not be necessary or practical. This is illustrated in FIG. 2B, where only some of the return air can be diverted to the scrubber 208 while the rest of the air can bypass the scrubber 208 and can flow directly to the air handling unit 106. In some embodiments, it is not essential that all of the air pass through the scrubber, as long over time a sufficient fraction of the unwanted substances, gases, etc. are captured and removed from the circulating air stream. In an embodiment shown in FIG. 2C, the scrubber 212 can be positioned downstream from the air handling unit 106, which has the advantage of colder air entering the scrubber and cooling it. Many scrubbing technologies and adsorbents can perform better with lower temperatures. From an air quality standpoint, any location of the scrubber can work, as long as there is over time adequate amount of contact between the circulating air and the scrubber somewhere along the flow path of the air before or after the air handling unit. In some embodiments, the scrubber(s) can be distributed in the occupied space 102.

In some embodiments, the scrubber can collect $CO_2$ and potentially other substances that can be disposed of in various ways. The collected substances can be released to the atmosphere, collected in containers for handling and disposing at another location, flowed through pipelines to another location or facility to be stored, processed and/or utilized, or otherwise disposed of in any other fashion. For example, $CO_2$ is beneficial for greenhouses and could be directed to such greenhouses by pipes or by containers. Alternatively, these byproduct gases can be sequestered indefinitely simply to avoid releasing them into the atmosphere. There can be a higher cost to such disposition of these gases and, in some situations, it might not necessarily be economically justifiable to do so.

Figure 4:
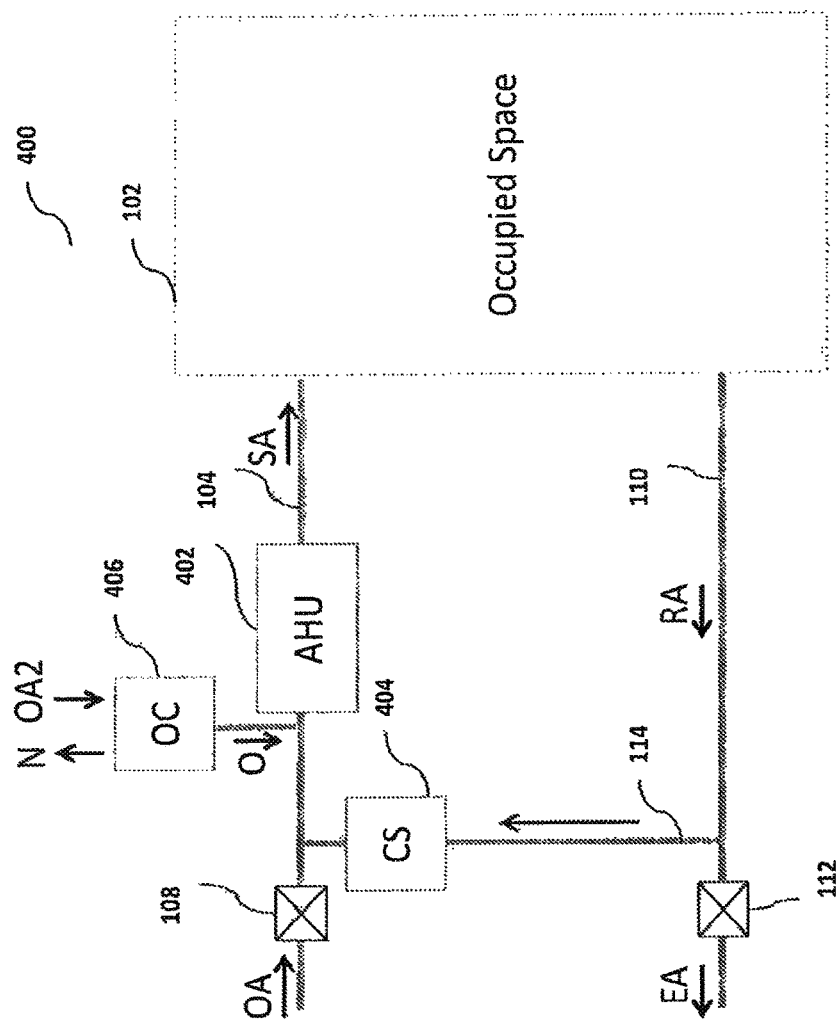
FIG. 4 is a block diagram illustrating an exemplary HVAC system that can include an oxygen injection system, according to some embodiments of the current subject matter.

FIG. 4 is a block diagram illustrating an HVAC system 400, according to some embodiments of the current subject matter. The system 400 includes an air handling unit 402 configured to supply air circulation to an occupied space 102 via line 104, where return air is transported via line 110. The system 400 also includes a scrubber 404 that is disposed in the line 114 connecting the supply air line 104 and the return air 110. The scrubber 404 can be disposed in any other fashion (as illustrated in FIGS. 2A-2C) and can be configured to perform air scrubbing discussed above. The system 400 further includes an oxygen concentrator 406. The oxygen concentrator 406 can take its own outside air supply ("OA2"), as shown by the arrows, and can create a flow of concentrated oxygen ("O") into the supply air line 104. The concentrated oxygen can be directed through an additional intake valve in to the air handling unit 402, upstream from the heating/cooling elements. The oxygen concentrator 406 can dispose of nitrogen ("N"), as indicated by the arrow in FIG. 4, and potentially other by-products back to the atmosphere (or any other location, container, etc.). The amount of oxygen added to the circulating air can depend on flow rate and the oxygen concentration. In some embodiments, the latter can be substantially greater than 90% (e.g., as is the case in most commercially available concentrators). However, a lower concentration can be also used to achieve the desired results with a slightly higher flow rate.

The oxygen concentrator 406 can be implemented in a number of ways. In some embodiments, the technique for oxygen concentration can include a known Pressure Swing Adsorption ("PSA") technique, Vacuum Swing Adsorption ("VSA") technique, and/or any other technique and/or any combination thereof. Systems employing these techniques can come in different sizes and output capacities, as stand-alone systems for providing concentrated oxygen directly from air, as well as in any other forms. Example VSA oxygen generating systems include at least one of the following: the PRISM VSA oxygen generation systems by Air Products Inc.; the OXYSWING product line by Innovative Gas Systems, Inc.; the ADSOSS line of oxygen generators by Linde; the VPSA oxygen generating system from Praxair Inc. These PSA/VSA systems can utilize highly porous adsorptive solids, usually a synthetic zeolite bed, in one or more container, typically shaped as a cylindrical column, and can use pumps and compressors to change the pressure of gases in these containers. The technique can rely on differential adsorption of oxygen and nitrogen onto the adsorbent. Thus, it can take an inflow of normal air (or other gas mixtures) and generate two separate outputs: an oxygen-concentrated air and oxygen-depleted air. One of the advantages of PSA/VSA systems is that these systems can continually generate oxygen for extended periods without much maintenance.

Other ways to separate or concentrate oxygen are also available. Cryogenic separation can be an effective way for large volumes and high purity, where the different condensation/boiling temperatures of different gases are used to separate oxygen from air. Selective membranes and selective diffusion media can also separate oxygen from air. Concentrated oxygen can also be generated from electrolysis of water, where electrical current through water generates oxygen gas on one electrode and hydrogen gas at the other. While these are energy intensive processes, pure hydrogen or nitrogen created as by products and can be collected and utilized for other applications.

In some embodiments, the presence of both the scrubber 402 and the oxygen concentrator 406 does not eliminate exhaust air and outside air. In some embodiments, exhaust air and outside air can be kept at a controlled level, which can be lower than in a conventional HVAC system but at a level that can be warranted or desired in order to assure that there is no gradual deterioration in air quality despite the benefits of the oxygen concentrator and the scrubbers.

In embodiments where the oxygen concentrator 406 is not used, the scrubber 404 can be configured to provide a majority of benefits related to circulation of quality air. This can be useful in scrubbing of carbon dioxide. While oxygen consumption and $CO_2$ emission go hand in hand and occur in almost identical molecular quantities, which can imply that a drop in oxygen concentration can be commensurate with a rise in $CO_2$ levels, as long as makeup air in the HVAC system is not eliminated altogether, even without a scrubber and an oxygen source, the oxygen and $CO_2$ levels can stabilize at certain asymptotical concentrations that together sum up approximately to 21%, the same as that of outside air. The asymptotic level of oxygen, X, is given by $$X = X_0 - B_o/M \quad (1)$$

where $X_0$ is the concentration of oxygen in outside-air, $B_o$ is the net amount of oxygen consumed (in CFM, liters/second or any other units) by the occupants and M is the amount of outside air injected (in same units, CFM, liter/second, etc respectively). Similarly, $CO_2$ level, Y, can be calculated by $$Y = Y_0 + B_c/M \quad (2)$$

where $Y_0$ is the concentration of $CO_2$ in outside-air and $B_c$ is the net amount of $CO_2$ produced by the occupants of the occupied space. Thus, as long as $B_c \approx B_o$, at least approximately, then $X + Y \approx X_0 + Y_0$. However, adding a scrubber that extracts $CO_2$ at a rate, $S_c$, (in same units, CFM, liter/second, etc. respectively) can result in $$Y = Y_0 + (B_c - S_c)/M \quad (3)$$

Analogously, the impact of an oxygen generator injecting at a net rate of $G_o$ (in same units, CFM, liter/second, etc., respectively) can change the asymptotic value of X to $$X = X_0 - (B_o - G_o)/M \quad (4)$$

EXAMPLE

For illustration purposes only, to understand why oxygen replenishment is less critical, the following example is provided: if outside air is at the normal 21% oxygen, and occupants of the occupied space consume oxygen at a rate of 2 CFM (cubic feet per minute) and exhale $CO_2$ at a similar rate, and if makeup air is at a relatively low 100 CFM, with no scrubbing or oxygen injection, then oxygen can gradually approach 19%, while $CO_2$ can approach 2%. There can also be elevated levels of other VOCs alongside the $CO_2$. Whereas a 19% concentration of oxygen can be acceptable, a 2% concentration of $CO_2$ is not. Further, the VOC levels most likely will be unacceptably high as well. Thus, adding a scrubber with $S_c = 2$ CFM capacity alone could bring $CO_2$ levels down to normal. Oxygen can still be depleted approximately to 19%, unless supplemental oxygen is injected, but even so air quality might be acceptable at this level even without an oxygen source, and can require less hardware and less operating costs.

Figure 5:
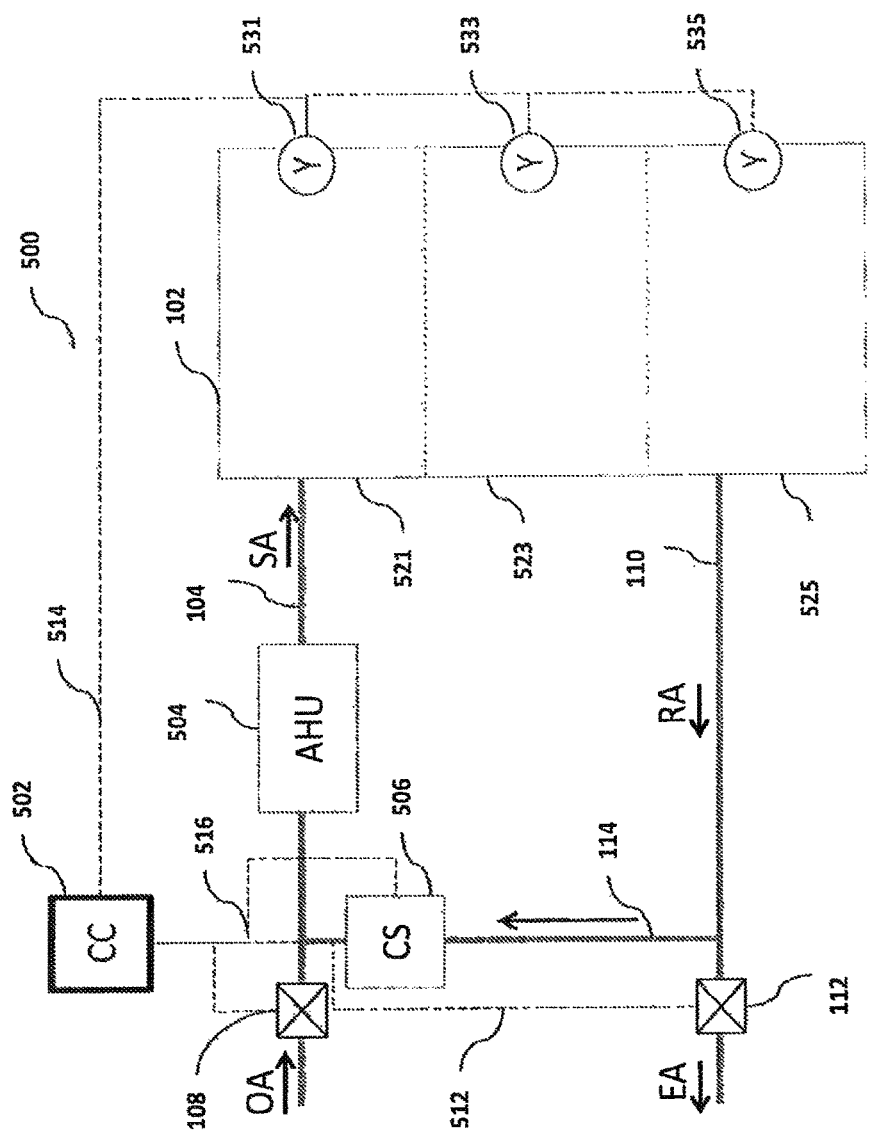
FIG. 5 illustrates an exemplary control flow for a controller for an HVAC system, according to some embodiments of the current subject matter.

FIG. 5 illustrates an exemplary HVAC system 500 that includes an air handling unit 504, a central control system ("CC") 502, a scrubber 506, and a plurality of sensors ("Y") 531, 533, 535 that can be installed in the occupied space 102. Connections of the AHU 504 and CS 506 as well as the supply air and return air lines similar to the ones shown and discussed in connection with FIGS. 1-4 above. The central control system 502 can be coupled to the components in the system 500 via various connections (e.g., electrically, wirelessly, wired, wireline, etc.) and can be configured to control them via issuance of various commands. The central control system 502 can include a processor, a memory, a monitor, and or any other components. It can control/operate components automatically, manually, or semi-automatically. The central control system 502 can be coupled to sensors 531, 533, 534 via connections 514, to the scrubber 506 via connections 516, and to the ducts 108, 112 via connections 512. The system 502 can be also configured to control AHU, an oxygen concentrator (not shown), and/or any other components.

The sensors 531, 533, 535 can be installed in various locations in the occupied space 102 and can be configured to provide a feedback to the system 502 system. Sensors (Y) can be distributed through the occupied space and detect levels of one or more substances, gases (such as $CO_2$ and/or oxygen, and other gases), fumes, vapors, VOCs, etc., and/or any combination thereof. Sensors for $CO_2$ are commercially available, examples of which include C7232 sensor from Honeywell Corp., TELAIRE sensors from General Electric, etc. Upon detection of and/or a particular concentration such substances, gases, etc., the sensor(s) (Y) can be configured to generate a data signal that can be transmitted to the central control system 502 for processing. After processing the data signal(s), system 502 can generate appropriate commands to components within the system 500 (e.g., turn on a regeneration cycle of the scrubber 506; perform adsorption cycle at a predetermined time or when concentration of a substance reaches a certain level).

As stated above central control system (CC) 502 can be human operated, automated and/or computerized and can detect a signal from the sensors (Y). Based on these and the various parameters and settings of the system 500, the CC 502 can control and/or modify at least one of the following, in order to achieve targeted conditions: OC power (on/off), OC settings, OC valves (OC is not shown in FIG. 5), CS settings, CS regeneration trigger, outside air flow rate, exhaust air flow rate, and any other functions. The system 502 can have fail safe measures to prevent unwanted elevation of oxygen, and the ability to shut down either or both oxygen concentrator and scrubber if needed and compensate by increasing outside air and exhaust air levels to those of a conventional HVAC.

The control system 502 can permit the amount of scrubbing or injection of oxygen to be adjustable, whether directly or indirectly, whether electronically or manually. Adjustments can be achieved by changing the power or settings applied to the various compressors, pumps, motors, heaters, actuators or valves associated with the scrubbers and the oxygen concentrators. The adjustments to the amount of scrubbing or oxygen injection can be automatically done in response to a measurement of air quality or air composition in one or more locations. The adjustments to the amount of scrubbing or oxygen injection can also be automatically done based on building occupancy, time of day, day of the week, date, season or outside climate.

In some embodiments, the scrubber 506 can be set to run at a constant operating mode. The capacity and efficiency of the scrubber 506 in that mode can be selected based on the occupied space and the amount of activity in the occupied space, so as to maintain desirable levels of $CO_2$ (and/or other substances). In some embodiments, the control system 502 can control a rate of exhaust air and outside air. The baseline can be a preset minimum. If the capacity and efficiency of the scrubber is insufficient to handle the $CO_2$ load, then the rate of exhaust air and outside air can be adjusted automatically to a higher level. The oxygen flow can be separately controlled to maintain a target level of oxygen in the occupied space. Both the control of the exhaust air valves and the oxygen inflow can be subject to a feedback loop, with a proportional-integral-differential ("PID") algorithm with upper and lower set points. The coupling of the oxygen concentrator to the air flow manifold can be done using any tube of duct fitting, with or without a control valve and/or a flow meter.

In some embodiments, the system can be designed in a modular way so that it can be retrofitted on a pre-existing or pre-designed HVAC system. This can be beneficial in buildings that already have HVAC systems, as the integration of the system can have relatively lower costs. The oxygen concentrator and scrubber, with a control system, can be installed and connected to a conventional HVAC system without having to replace the ductwork or the central air handling unit.

In some embodiments, the current subject matter relates to a system for circulating air in an enclosed environment. The system can include an inlet configured to receive an outside air from outside of the enclosed environment and an air handling unit coupled to the inlet to receive the outside air through the inlet and configured to receive a circulated air from the enclosed environment. The air handling unit can be configured to affect a temperature of at least one of the received outside air and the received circulated air. Based on the received outside air and the received circulated air, the air handling unit can be further configured to generate air for supplying to the enclosed environment. The current subject matter system can also include an air circulation system configured to circulate the generated air from the air handling unit to the enclosed environment and back to the air handling unit and a scrubbing system coupled to at least one of the air handling unit and the air circulation system and configured to reduce presence of at least one substance in the air supplied to the enclosed environment.

In some embodiments, the current subject matter can also include one or more of the following optional features. The scrubbing system can be configured to intercept at least a portion of the received circulated air prior to the circulated air reaching the air handling unit. The scrubbing system can intercept at least a portion of the circulated air after the circulated air is processed by the air handling unit. In some embodiments, between approximately 1% to approximately 50% of the circulated air can be diverted to the scrubbing system and a remainder of the circulated air can bypass the scrubbing system. In some embodiments, between approximately 3% to approximately 25% of the circulated air can be diverted to the scrubbing system and a remainder of the circulated air can bypass the scrubbing system. In some embodiments, between approximately 5% to approximately 15% of the circulated air can be diverted to the scrubbing system and a remainder of the circulated air can bypass the scrubbing system. In some embodiments, at least one substance in the air is carbon dioxide. In some embodiments, at least one substance in the air can include at least one of the following: volatile organic compounds, carbon monoxide, nitrous oxides and sulfur oxides.

The current subject matter system can include a control system coupled to at least one sensor, where at least one sensor is disposed in at least one of the following: the enclosed environment and the air circulation system. At least one sensor can determine a composition of the circulated air and provide the determination of the composition of the circulated air to the control system. Based on the determination of the composition of the circulated air, the control system can control at least one of the following: the scrubbing system and the air inlet system, and can be further configured to maintain a desired composition of the circulated air. An airflow through the inlet is such that the desired air quality can be maintained with a lower amount of outside air than would be possible without the scrubbing system.

The scrubbing system can include at least one adsorbent, wherein a concentration of the at least one substance is reduced by adsorption of the at least one substance onto the adsorbent. At least one adsorbent can include at least one of the following: a molecular sieve, a synthetic zeolite, an activated charcoal, porous alumina, silica gel, a clay-based material, and a metal organic framework. The scrubbing system can include at least one additional adsorbent. At least one additional adsorbent can be mixed with the at least one adsorbent in the scrubbing system. The scrubbing system can include a plurality of beds, wherein each bed in the plurality of beds is configured to intercept a flow of circulated air, and at least two of beds in the plurality of beds have different adsorbents. The scrubbing system can also include a system for controlling a reversible chemical reaction that includes carbon dioxide. The reversible chemical reaction can be a sodium carbonate and sodium bicarbonate cycle. Also, the reversible chemical reaction can be between an amine compound and carbon dioxide. The scrubbing system can utilize one or more bases. The base can be an alkaline hydroxide. The scrubbing system can be a temperature swing adsorption system. The scrubbing system can further include a purge cycle during which a purge substance is applied to the scrubbing system to release the at least one substance from the scrubbing system. The purge substance can be gas. The purge substance can be heated by applying heat generated a component of a heating, ventilation and air-conditioning system incorporating the air circulation system.

The current subject matter system can include a heating system configured to heat the purge substance. The heating system can use solar energy. The scrubbing system can include an adsorbent and a cooling system configured to cool the adsorbent, wherein the cooling system uses a chilled fluid provided by the air handling unit. The scrubbing system can be coupled to the air circulation system such that at least one part of the circulated air is configured to flow through the scrubbing system and at least another part of the circulated air is configured to bypass the scrubbing system.

The current subject matter system can also include an oxygen injection system that injects oxygen or an oxygen-concentrated air into the circulated air. The current subject matter system can further include a control system coupled to at least one sensor disposed in the enclosed environment. At least one sensor can determine an oxygen level in the circulated air and provide the determination of the oxygen level in the circulated air to the control system. Based on the determination of the oxygen level in the circulated air, the control system can control the oxygen injection system so as to maintain a desired level of oxygen in the circulated air. The oxygen injection system can include at least one of the following: a pressure swing adsorption and a vacuum swing adsorption system.

Figure 6:
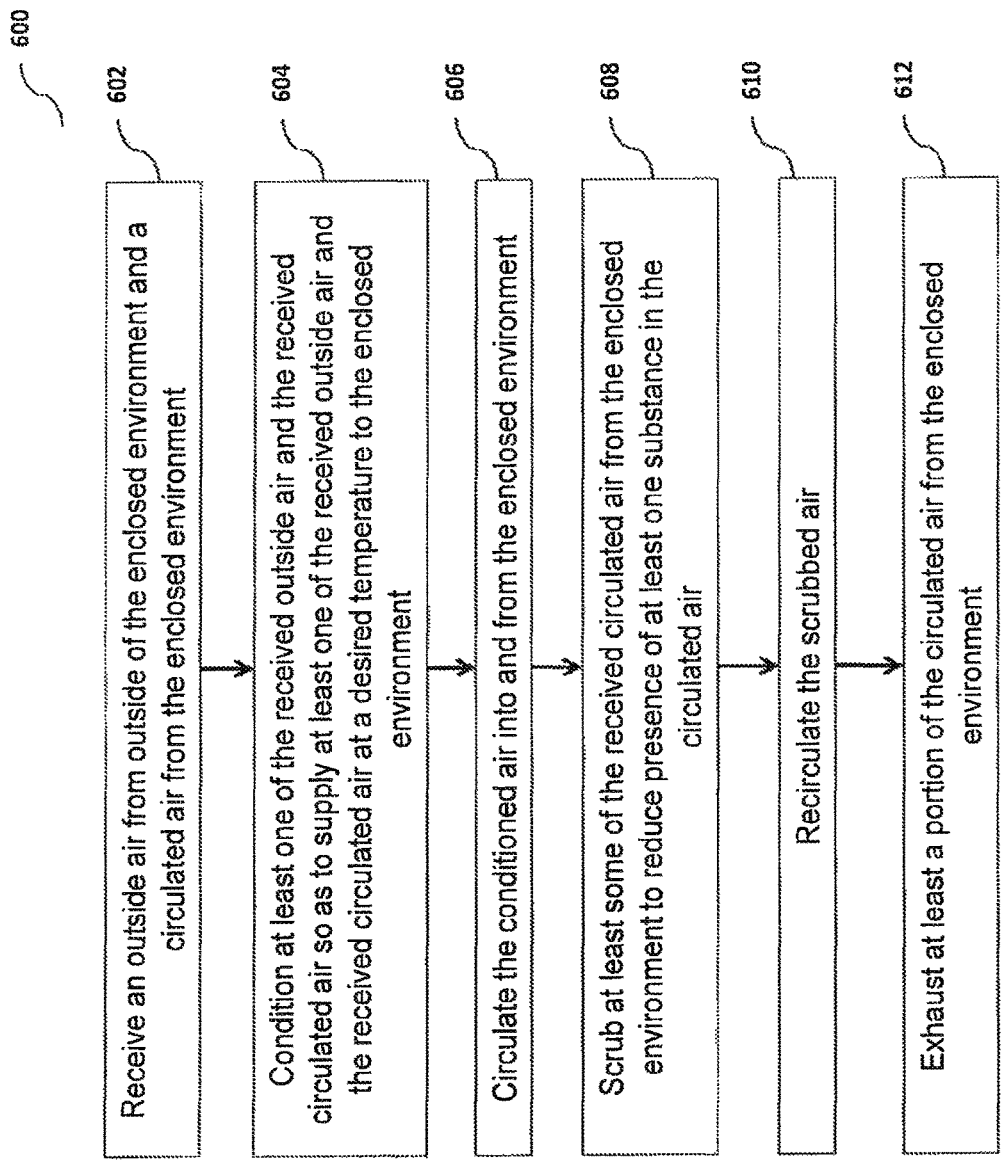
FIG. 6 is a flow chart illustrating an exemplary method according to some embodiments of the current subject matter.

FIG. 6 illustrates an exemplary process 600 for circulating air in an enclosed environment, according to some embodiments of the current subject matter. At 602, an outside air from outside of the enclosed environment and a circulated air from the enclosed environment are received. At 604, at least one of the received outside air and the received circulated air are conditioned so as to supply at least one of the received outside air and the received circulated air at a desired temperature to the enclosed environment. At 606, the conditioned air is circulated into and from the enclosed environment. At 608, at least some of the received circulated air from the enclosed environment is scrubbed to reduce presence of at least one substance in the circulated air. At 610, the scrubbed air is recirculated. At 612, at least a portion of the circulated air is exhausted from the enclosed environment.

In some embodiments, the current subject matter relates to a control system for use with an HVAC system having a gas scrubbing system for removal of an unwanted gas from circulated air. The control system can include a sensor for determining an amount of the unwanted gas in the circulated air and a controller configured to modify a rate of exhaust of circulated air or intake of outside air so as to adjust an overall air replacement according to the measured amount of unwanted gas in the circulated air.

Further features and advantages of the invention, as well as structure and operation of various embodiments of the current subject matter, are disclosed in detail below with references to the accompanying drawings.

Example embodiments of the methods and components of the current subject matter have been described herein. As noted elsewhere, these example embodiments have been described for illustrative purposes only, and are not limiting. Other embodiments are possible and are covered by the current subject matter. Such embodiments will be apparent to persons skilled in the relevant art(s) based on the teachings contained herein. Thus, the breadth and scope of the current subject matter should not be limited by any of the above-described exemplary embodiments, but should be defined only in accordance with the following claims and their equivalents.

What is claimed is:

1. A building air treatment system configured for use with a heating and air conditioning (HVAC) system of a building, comprising:
   an inlet configured to receive air from outside of an enclosed environment of a building for supply thereto;
   an HVAC system configured to heat and/or cool an airflow received from the enclosed environment;
   a controller;
   at least one sensor configured to provide a signal determinative of a level of at least one contaminate contained in the air of the enclosed environment to the controller; and
   a scrubbing system having at least one adsorbent,
   wherein the scrubbing system is configured to:
      receive at least a portion of the airflow and expose the at least a portion to the adsorbent so as to reduce the concentration of the at least one contaminant in the air of the enclosed environment by adsorption thereof by the adsorbent, and
      receive a purging substance and be cycled to purge the adsorbent so as to desorb the adsorbed at least one contaminate therefrom;
   and wherein the controller is configured to control an intake rate of outside air into the enclosed environment based upon a level of the at least one contaminate in the air of the enclosed environment.

2. The system of claim 1, wherein the purging substance comprises a gas.

3. The system of claim 1, wherein the HVAC system is configured to heat the purging substance.

4. The system of claim 1, wherein controller is configured to control the intake rate of outside air so as to reduce the energy consumption required by heating or cooling outside air by the HVAC of the building.

5. The system of claim 1, wherein the exposing of the at least a portion of the airflow to the adsorbent and controlling of the intake of outside air is configured to maintain a desired level of the contaminant for the air of the enclosed environment.

6. The system of claim 1, wherein the controller is further configured to control at least one of the HVAC system and scrubbing system to maintain a desired level of the contaminant for the air of the enclosed environment.

7. The system according to claim 1, wherein the scrubbing system comprises a plurality of beds, wherein each bed is configured to intercept a portion of air for scrubbing.

8. A building air treatment method configured for use with a heating and air conditioning (HVAC) system of a building, comprising:
   providing the system of claim 1;
   receiving an airflow containing at least one contaminate from the enclosed environment of the building;
   monitoring the level of the at least one contaminate in the airflow;
   monitoring at least one of a temperature and a humidity of the airflow;
   heating or conditioning the received airflow upon the airflow requiring a change in temperature and/or humidity;
   exposing at least the portion of the received airflow to the at least one adsorbent, the adsorbent configured to remove at least a portion of the at least one contaminate; and
   controlling the intake rate of outside air into the enclosed environment based upon the level of the at least one contaminate in the airflow.

9. The method of claim 8, further comprising cyclically purging the at least one adsorbent material so as to desorb the adsorbed at least one contaminate.

10. The method of claim 9, wherein purging comprises exposing the at least one adsorbent to a purging substance.

11. The method of claim 10, wherein the purging substance comprises a gas.

12. The method of claim 10, wherein the purging substance is heated by a component of the HVAC system of the building.

13. The method of claim 8, wherein the intake rate of outside air is controlled so as to reduce the energy consumption required by heating or cooling outside air by the HVAC of the building.

14. The method of claim 8, wherein the exposing of the at least a portion of the airflow to the adsorbent material and controlling of the intake of outside air is configured to maintain a desired level of the contaminant for the air of the enclosed environment.

15. The method of claim 9, wherein purging the at least one adsorbent material is accomplished via at least one of a temperature swing adsorption cycle, a concentration swing adsorption cycle, and a pressure swing adsorption cycle.

16. A building air treatment system configured for use with a heating and air conditioning (HVAC) system of a building, comprising:
   an inlet configured to receive air from outside of an enclosed environment of a building for supply thereto;
   an HVAC system configured to heat and/or cool an airflow received from the enclosed environment;
   a controller;
   at least one sensor configured to provide a signal determinative of a level of at least one contaminate contained in the air of the enclosed environment to the controller; and
   a scrubbing system having at least one adsorbent,
   wherein the scrubbing system is configured to:
      receive only a portion of the airflow and expose the portion to the adsorbent so as to reduce the concentration of the at least one contaminant in the air of the enclosed environment by adsorption thereof by the adsorbent, and
      receive a purging substance and be cycled to purge the adsorbent so as to desorb the adsorbed at least one contaminate therefrom;
   and wherein the controller is configured to control an intake rate of outside air into the enclosed environment based upon a level of the at least one contaminate in the air of the enclosed environment.

* * * * *